US012664967B2

(12) United States Patent
Narasimhan et al.

(10) Patent No.: US 12,664,967 B2
(45) Date of Patent: Jun. 23, 2026

(54) ADVANCED NOISE SUPPRESSION SYSTEM

(71) Applicant: Logitech Europe S.A., Lausanne (CH)

(72) Inventors: Poornima Narasimhan, Tamil Nadu (IN); Muthuselvam Muthiah, Tamil Nadu (IN); Sarathkumar Sundaram, Tamil Nadu (IN); Meena Ramani, Fremont, CA (US)

(73) Assignee: Logitech Europe S.A., Lausanne (CH)

( * ) Notice: Subject to any disclaimer, the term of this patent is extended or adjusted under 35 U.S.C. 154(b) by 125 days.

(21) Appl. No.: 18/748,084

(22) Filed: Jun. 19, 2024

(65) Prior Publication Data

US 2025/0391394 A1 Dec. 25, 2025

(51) Int. Cl.
*G10K 11/178* (2006.01)

(52) U.S. Cl.
CPC .. *G10K 11/17823* (2018.01); *G10K 11/17873* (2018.01); *G10K 2210/1081* (2013.01); *G10K 2210/3027* (2013.01)

(58) Field of Classification Search
CPC ....... G10K 11/17823; G10K 11/17873; G10K 2210/1081; G10K 2210/3027
See application file for complete search history.

(56) References Cited

U.S. PATENT DOCUMENTS

| | | | | |
|---|---|---|---|---|
| 8,600,454 | B2 * | 12/2013 | Nicholson | H04M 1/605 381/71.1 |
| 10,553,235 | B2 * | 2/2020 | Bryan | G10L 21/0364 |
| 11,676,568 | B2 * | 6/2023 | Hamalainen | G10K 11/17857 381/71.6 |
| 12,272,368 | B2 * | 4/2025 | Sha | G10L 21/0216 |
| 2009/0059821 | A1 * | 3/2009 | Wu | H04M 9/082 370/286 |
| 2022/0406285 | A1 * | 12/2022 | Neves | H04R 1/08 |
| 2024/0096308 | A1 * | 3/2024 | Li | H04R 1/1083 |
| 2024/0386899 | A1 * | 11/2024 | Mehta | G10L 21/0208 |
| 2025/0133328 | A1 * | 4/2025 | Li | H04R 3/005 |

* cited by examiner

*Primary Examiner* — Paul W Huber
(74) *Attorney, Agent, or Firm* — Patterson + Sheridan, LLP; Joseph J. Stevens; Mark O'Boyle

(57) ABSTRACT

An audio device includes a noise suppression system that delivers output audio data to an audio output device of the audio device, and includes a transceiver that receives audio input data, and a digital signal processing (DSP) chip that receives first processed audio data from the transceiver and delivers the output audio data to the audio output device. The DSP chip includes an advanced call clarity (ACC) module that includes a first audio data path and a second audio data path, wherein an output both audio paths are delivered to a node coupled to the audio output device. The first audio data path delivers the first processed audio data to the audio output device, and the second audio data path generates ACC output audio data based on the received first processed audio data and delivers the ACC output audio data to the audio output device.

19 Claims, 8 Drawing Sheets

ADVANCED NOISE SUPPRESSION SYSTEM

BACKGROUND

Field

Embodiments of the present disclosure generally relate to an audio device that includes a noise cancelling system. In particular, embodiments disclosed herein relate to an audio device that can cancel noise on a near end and/or a far end of interconnected conferencing environments.

Description of the Related Art

On a daily basis, people on video conference calls or phone calls with at least one other person are subjected to background noise that can be disruptive and impact the quality of the conversation between the people on these calls. Background noise can be disruptive to a user on both ends of a video conference call or phone call. For example, a first user in a first remote location is on a call with a second user in a second remote location. Background noise, such as a neighbor mowing a lawn, pets barking, children crying, travel related noise (such as a car engine), or the like can be distracting to users on at least the opposing end and/or both ends of the call. From the perspective of the second user background noise picked by a microphone in the first remote location can be delivered to an audio output of an audio device used by the second user. Typical audio devices are able only to cancel out noise in the location they are located in by use of various conventional noise cancellation techniques, such as active noise cancellation (ANC) techniques. For example, an audio device such as headphones worn by the second user can cancel out noise generated in the second user's location by use of an ANC technique. However, conventional ANC techniques require a significant amount of processing power and thus electrical power to actively remove the noise generated in the space that the audio device is positioned in real time, which will dramatically limit the battery life of audio devices that are not directly connected to a power source, such as an electrical outlet. Moreover, the audio device, such as headphones worn by the second user, cannot cancel out noise generated in and received from the first remote location in which the second user is not positioned.

Audio devices that are not limited to communication with a single electronic device, such as a laptop computer, smartphone or other similar device, and can be dynamically switched to receive an audio signal from different electronic devices greatly increases the usability of the audio device. Thus, there is a need for an audio device that can communicate with multiple different types of electronic devices, is able to perform noise cancellation activities on its own, without the need to perform some or part of the noise cancellation activities of the electronic device that is in communication with the audio device, and cancel out the noise in the audio signal received by the audio device from electronic device before the audio signal is provided to a user of the audio device.

There is also at least a need for an audio device that can cancel out background noise received from other electronic devices that are in communication with the audio device, such as electronic devices positioned at the far end (i.e., the first remote location) of a video conference call or phone call.

SUMMARY

According to one or more embodiments, an audio device includes a noise suppression system configured to deliver output audio data to an audio output device of the audio device, the noise suppression system including a transceiver configured to receive audio input data; and a digital signal processing (DSP) chip configured to receive first processed audio data from the transceiver and deliver the output audio data to the audio output device of the audio device, the DSP chip including an advanced call clarity (ACC) module that comprises a first audio data path and a second audio data path, wherein an output of the first audio data path and an output of the second audio data path are delivered to a node coupled to the audio output device, the first audio data path is configured to deliver the first processed audio data to the audio output device, and the second audio data path is configured to generate ACC output audio data based on the received first processed audio data and deliver the ACC output audio data to the audio output device.

According to one or more embodiments, a method includes receiving, by a transceiver of an audio device, audio input data, receiving first processed audio data from the transceiver, wherein the first processed audio data comprises the audio input data, delivering output audio data to an audio output device of the audio device, wherein delivering the output audio data includes delivering the first processed audio data using a first audio data path of an advanced call clarity module (ACC), receiving, by the ACC module, an ACC request, and based on the receiving of the ACC request, switching from delivering the first processed audio data using the first audio data path to delivering ACC output audio data using a second audio data path of the ACC module, wherein an output of the first audio data path and the second audio data path are coupled to a node that is coupled to the audio output device.

According to one or more embodiments, a noise suppression system includes a transceiver configured to receive audio input data, and a digital signal processing (DSP) chip configured to receive first processed audio data from the transceiver and deliver output audio data to an audio output device of an audio device, the DSP chip including an advanced call clarity (ACC) module that comprises a first audio data path and a second audio data path, wherein an output of the first audio data path and an output of the second audio data path are delivered to a node coupled to the audio output device, the first audio data path is configured to deliver the first processed audio data to the audio output device, and the second audio data path is configured to generate ACC output audio data based on the received first processed audio data and deliver the ACC output audio data to the audio output device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Background noise present during a call can be disruptive and impact the quality of the conversation between the users that are present on the call. For example, if a first user 102A in a first remote location 101A and a second user in a second remote location 101B are on a call, background noise on both ends of the call such as, such as a neighbor mowing a lawn, pets barking, children crying, travel related noise (such as a car engine), or the like can be distracting to the users that are a part of the call. From the perspective of the second user 102B, background noise captured by a microphone in the first remote location 101A (i.e., the far end) may be delivered to an audio output of an audio device 100 (such as headphones) used by the second user 102B. The background noise generated in the first remote location 101A may make it difficult for the second user 102B to hear what the first user 102A is communicating and/or may distract the second user 102B. Furthermore, background noise in the second remote location 101B (i.e., the near end) may also make it more difficult for the second user 102B to hear and understand the first user 102A. Conventional audio devices are able to cancel out the noise generated only in the near end environment, or, in other words, the environment that the audio device is positioned within during the call. For example, a conventional audio device used by the second user 102B positioned in the second remote location can only cancel out background noise in the second remote location by use of a conventional noise cancellation technique.

However, one or more of the embodiments disclosed herein relate to an audio device that can actively cancel out noise found in an audio signal received by an audio device from an electronic device positioned in a far end environment. In some embodiments, an audio device is configured to actively cancel out noise received by the audio device that was generated in the near end environment and cancel out noise found in an audio signal received by the audio device from an electronic device positioned in a far end environment.

Figure 1A:
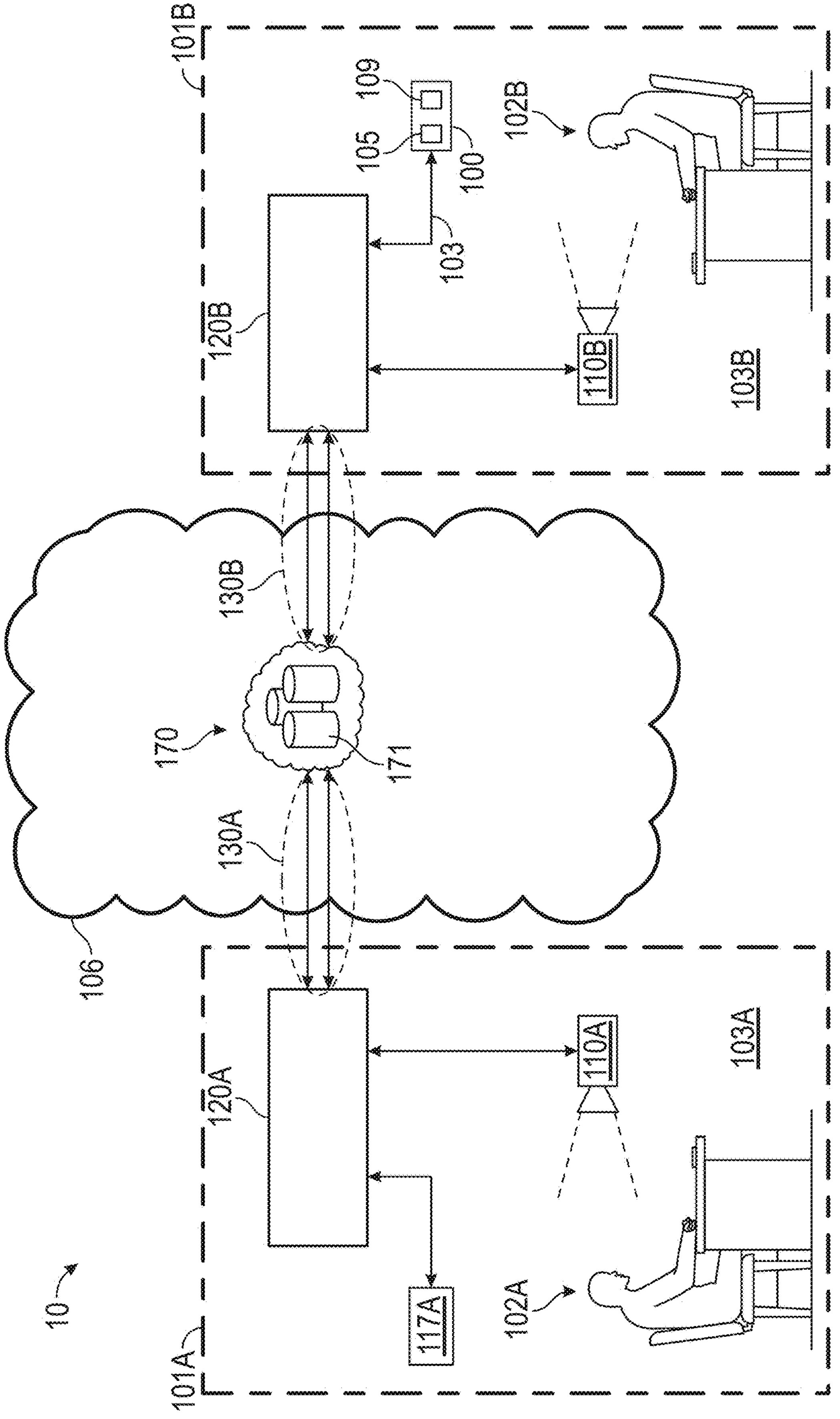
FIG. 1A is a diagram of a calling system 10, according to one or more embodiments.

FIG. 1A is a diagram of a conference calling system, or simply calling system 10, according to one or more embodiments. The calling system 10 includes a first remote location 101A and a second remote location 101B. The related equipment at each remote location 101A, 101B can include at least one microphone, at least one electronic device for providing the call stream to and from the remote locations 101A, 101B to the users, and at least one controlling device for handling the distribution of the different types of data exchanged between the remote locations 101A, 101B. In some cases, the calling system 10 can include one or more cameras, at least one microphone, at least one electronic device for providing the call stream to and from the remote locations 101A, 101B, and at least one controlling device for handling the distribution of the different types of data exchanged between the remote locations 101A, 101B. The related equipment for each remote location 101A, 101B is described in more detail below.

The second remote location 101B is at a remote location relative to the first remote location 101A. Stated differently, a first user 102A may be located in the first remote location 101A and a second user 102B may be located at the second remote location (or vice versa). For example, the second remote location 101B may include one or more remote locations that each include equipment used to facilitate the communication between users positioned at the various locations. Stated differently, the second remote location 101B may represent one or more remote locations occupied by one or more users. A remote location can be any location where it would not be feasible for a user at the remote location of the call to communicate to another user without the use of an external device (e.g., an electronic device, such as a smart phone, tablet, laptop, microphone, etc.). The call between the first user 102A (i.e., the first remote location 101A) and the second user 102B (i.e., the second remote location 101B) can be connected through a network 109. The network 109 generally represents any data communications network suitable for the transmission and receipt of audio data and/or video data.

The calling system 10 enables the first user 102A and the second user 102B to receive audible information, such as verbal communications. For example, audio and/or video data (can be exchanged through a communication software application 170 including but not limited to, Microsoft® Skype®, Microsoft® Teams®, Zoom®, Google® Hangouts®, a phone call app, a video game, streaming applications, or the like. The communication software application can include a communication node 171 to allow the first user 102A located at the first remote location 101A to communicate with the second user 102B located at the second remote location 101B. Although a first user 102A is in a first remote location 101A during a call with a second user 102B that is in a second remote location is described herein, this is only intended as an example, and any number of users in any number of remote locations can be communicating using the calling system 10. The electronic devices 120A, 120B can communicate with the communication node 171 of the communication software application 170 through corresponding first and second network links 130A, 130B.

Optionally, auxiliary data can also be exchanged between the respective remote locations 101A, 101B through the communication software application 170 to further enhance the interaction between the users 102A, 102B. In some embodiments, the auxiliary data can be exchanged using a separate cloud service. This auxiliary data can include any data exchanged between the remote locations 101A, 101B. For example, auxiliary data can include data related to instant messaging applications, screen sharing applications, or electronic document sharing applications.

Figure 1B:
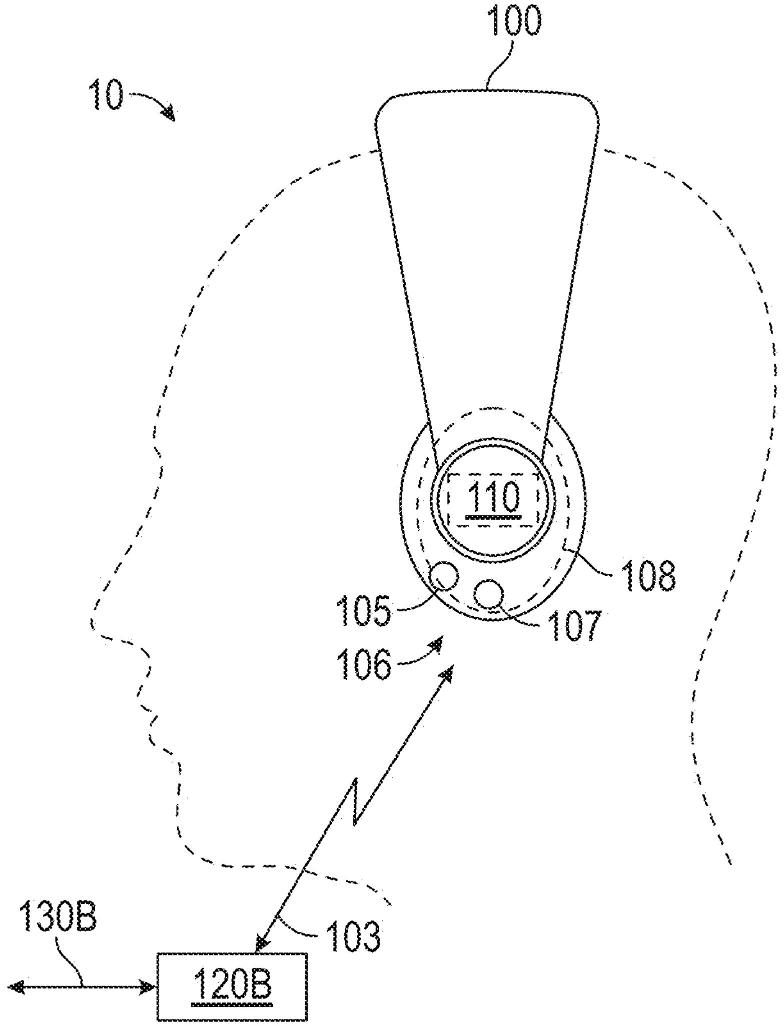
FIG. 1B illustrates a schematic view of an audio device 100, according to one or more embodiments.

The related equipment for the remote locations 101A, 101B can include audio devices, cameras, microphones, and display devices. For example, each remote location 101A, 101B includes various electronic devices. For example, the first remote location 101A includes one or more audio devices, such as one or more microphones 117. The second remote location can include one or more audio devices, such as an audio device 100 (FIG. 1B). The audio devices may be connected to a respective electronic device 120A, 120B (e.g., a laptop, personal computer, tablet, smart phone, television, etc.) by use of a communication link 103 that can include a wired or wireless connection. Optionally, the remote locations 101A, 101B may include a camera device. For example, the first remote location 101A includes a camera device 110A, the one or more microphones 117A, and an electronic device 120A. The second remote location 101B includes a camera device 110B, the audio device 100, and an electronic device 120B.

FIG. 1B illustrates a schematic view of an audio device 100, according to one or more embodiments. In one or more embodiments, the audio device 100 may include a noise suppression system 110 configured to establish a wired or wireless connection using a communication link 103 formed with an electronic device 120B, such as a television, a desktop computer, a laptop, a mobile phone, a tablet, or the like. The audio device 100 may include headphones (a headset), a wired or wireless speaker, conference call device, or form a part of another type of audio producing device. It should be understood that in embodiments herein, the audio device 100 is described as headphones for example purposes only. The audio device 100 may be any suitable audio device. In one or more examples, the audio device 100 is able to connect to any suitable electronic device and switch connections between different audio devices mid-call. As discussed above, there is a need for an audio device that can communicate with multiple different types of electronic devices, is able to perform noise cancellation activities on its own, without the need to perform some or part of the noise cancellation activities of the electronic device that is in communication with the audio device, and cancel out the noise in an audio signal received by the audio device from the electronic device before the audio signal is provided to a user of the audio device. In one or more examples, the second user 102B can disconnect from the second electronic device 120B (a personal computer for example) to a mobile phone (not shown) mid-call without disrupting the conversation.

Figure 2A:
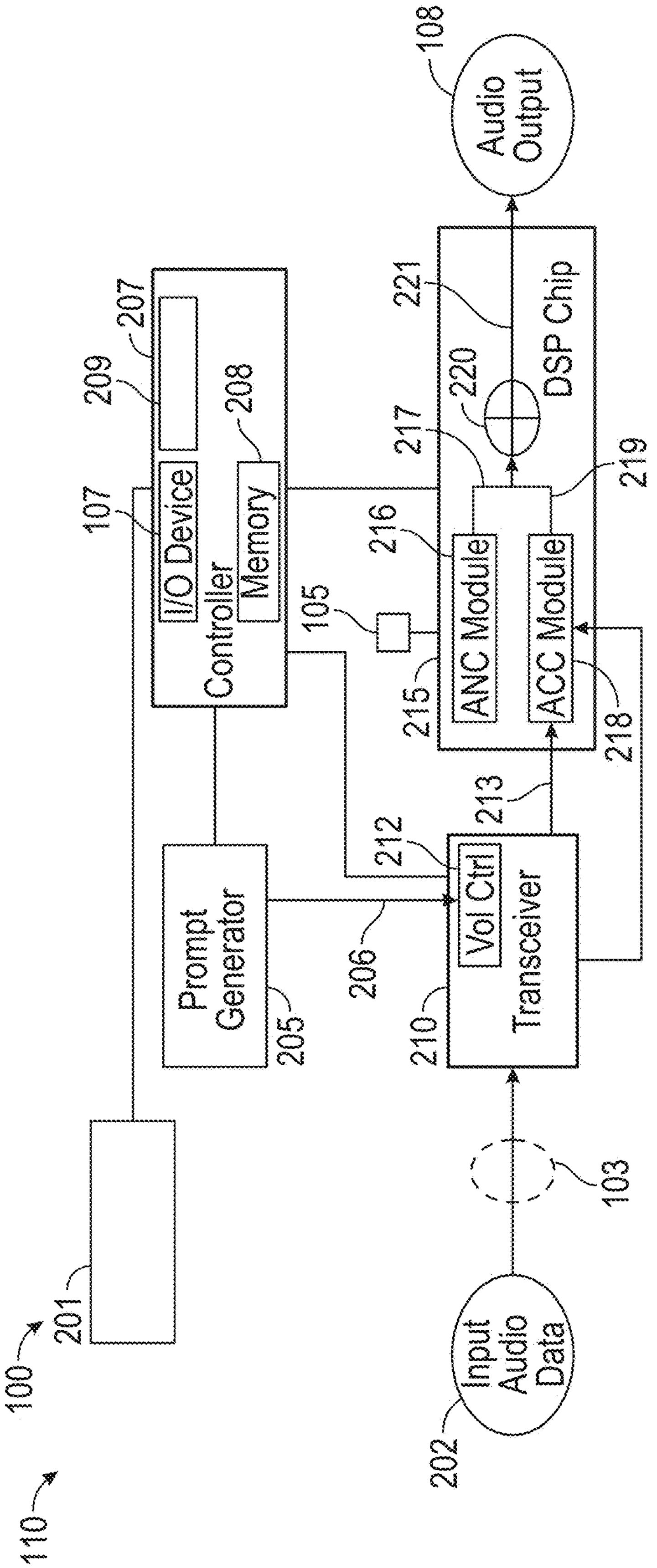
FIG. 2A illustrates schematic block diagram of a noise suppression system of an audio device, according to one or more embodiments.
Figure 2B:
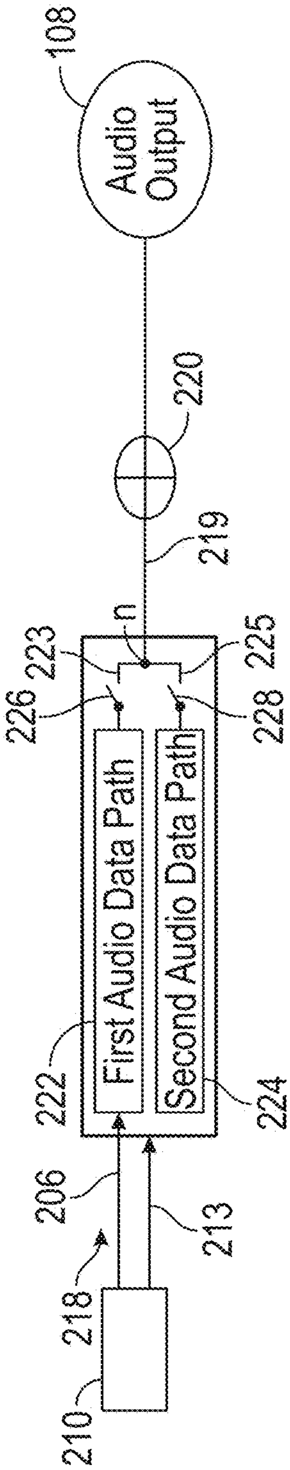
FIG. 2B illustrates schematic block diagram of the advance call clarity (ACC) module of the noise suppression system of FIG. 2A, according to one or more embodiments.

In one or more embodiments, the audio device may include an audio output device 108 (FIG. 1B), such as an audio speaker. The audio output device 108 may be coupled to outputs of the noise suppression system 110 (FIGS. 2A-2B). In one or more embodiments, if the audio device 100 is a headphone, the audio output device 108 may be located in the earpieces 106.

As will be described below, the noise suppression system 110 may be used in a call between the first user 102A and the second user 102B. It should be understood, that this is for example purposes only, and the call may include more than two users located in two or more remote locations. Embodiments herein, will also be described from the perspective of the second user 102B. Stated otherwise, embodiments herein are described from the perspective of the audio device 100 located in the second remote location 101B (i.e., used by the second user 102B). The first remote location 101A is defined herein as the far end, and the second remote location 101B is defined herein as the near end from the perspective of the second user 102B.

In one or more embodiments, the audio device 100 may include one or more microphones 105. The one or more microphones 105 are configured to capture audio within a corresponding local environment in which the audio device 100 is positioned, and generate audio data based on the captured audio. In one or more embodiments, the audio device 100 may include an input/output (I/O) device 107. The I/O device 107 may be a button 109 that can be pressed by a user to active/deactivate a feature offered by the noise suppression system 110. This will be described in more detail below. Separately, one or more microphones 117 can be used to capture audio in the first remote location 101A, such as the first user 102A's voice or background noise generated in the first remote location 101A, generate audio data based on the captured audio, and deliver the audio to the audio output device 108 of the audio device 100 used by the second user 102B via a communication software application 170 including but not limited to, Microsoft® Skype®, Microsoft® Teams®, Zoom®, Google® Hangouts®, a phone call app, a video game or the like.

As noted above, background noise on either side of a call can be disruptive to the participants. For example, a baby crying, a dog barking, a neighbor mowing the lawn, or the like can be captured by the one or more microphones 105 in the local environment (e.g., second remote location 101B) can make it challenging for the second user 102B to hear audio provided from the first user 102A. Additionally, similar background noise in the first remote location 101A can make it difficult for the second user 102B to hear the first user 102A (or vice versa). Embodiments herein, relate to an audio device 100 including a noise suppression system 110 that can cancel out background noise captured on the far end and/or on the near end relative to an audio device 100 positioned at the near end.

FIG. 2A illustrates schematic block diagram of the noise suppression system 110 of an audio device 100, according to one or more embodiments. FIG. 2B illustrates schematic block diagram of the advance call clarity (ACC) module 218 of the noise suppression system 110, according to one or more embodiments.

The noise suppression system 110 may include a prompt generator 205, a controller 207, a transceiver 210, and a digital signal processing (DSP) chip 215. In one or more embodiments, the controller 207 may include memory 208, a processor 209, and the input/output (I/O) device 107. In one or more embodiments, the controller 207 is in bi-directional communication with the prompt generator 205, the transceiver 210, and the DSP chip 215, and an audio generation device software application 201. In some embodiments, the audio generation device software application 201 may be installed on and launched on numerous different electronic devices such as a personal computer, mobile phone, gaming system, tablet, or the like.

As will be described in more detail below, the audio generation device software application 201 may be used in conjunction with the controller 207 to control the noise suppression system 110. The audio generation device software application 201 may be launched on any suitable electronic device, which can include the audio device 100. The user may use the audio generation device software application 201 to request activation/deactivation (i.e., initialization/termination) of different features of the audio device 100. Features include, but are not limited to, muting the one or more microphones 105, cancelling out noise on captured in either of the remote locations, or the like. Additionally, or alternatively, a user may use the I/O device 107 to request activation/deactivation of at least one feature provided by the noise suppression system 110 by use of the communication link 103 that is connected to an electronic device, such as the electronic device 120B.

The controller 207 may include a processor 209 that analyzes information and carries out a series of executable scripts, e.g., stored in the memory 208. In one or more embodiments, the processor 209 may comprise an application-specific integrated circuit (ASIC) device, a system on chip (SOC), or any other processing unit known in the art. The memory 208 may be programmed for short term and/or long term memory storage. The memory 208 may comprise one or more program(s) to be executed by the processor 209 disposed in the controller 207. The memory 208 may include both volatile and non-volatile memories. In one or more examples, the controller 207 may be coupled to the I/O device 107, to allow users to directly instruct the controller 207 to activate/deactivate at least one feature provided by the noise suppression system 110.

The transceiver 210 may be configured to establish a communication link between the audio device 100 and an electronic device. The transceiver 210 may establish the communication link 103 via a Wi-Fi communication link, a BLUETOOTH™ communication link, Averna Audio Link (AAL), or near field communication (NFC) link or the like.

Audio input data 202 is delivered to the transceiver 210 of the audio device 100, which is associated with the second user 102B, via the communication link 103. The audio input data 202 may include any type of audio data delivered to the second user 102B by a communication software application 170 including but not limited to, Microsoft® Skype®, Microsoft® Teams®, Zoom®, Google® Hangouts®, a phone call app, a video game, or the like. The audio input data 202 may include audio captured by the one or more microphones 117 located in the first remote location (far end) that is processed by the calling software application and delivered to the transceiver 210. For example, audio input data 202 may include speech from the first user 102A and any background noise generated in the first remote location 101A.

In one or more embodiments, the transceiver 210 processes the audio input data 202 and delivers first processed audio data 213 to the DSP chip 215. The DSP chip 215 then performs additional processing on the first processed audio data 213. The DSP chip 215 includes an advanced call clarity (ACC) module 218 and an active noise cancellation (ANC) module 216 that are each coupled to a mixer 220. Stated otherwise, the mixer includes a first input coupled to an output of the ANC module 216, a second input coupled to the ACC module 218, and an output coupled to the audio output device 108.

In one or more embodiments, the ACC module 218 is configured to receive the first processed audio data 213 and output second processed audio data 219 to the second input of the mixer 220 based on the first processed audio data 213. The ACC module 218 performs advanced call clarity techniques upon receiving an advanced call clarity request from a user. In one or more embodiments, an ACC algorithm running within the ACC module 218 is used to cancel out (i.e. suppress) background noise captured on the far end of a call. For example, if there is background noise present in the first remote location, which is found in the first processed audio data 213, that is distracting to the second user 102B, ACC algorithm can be requested and used to cancel out the background noise using the audio device 100 located in second remote location (e.g., near end relative to the audio device 100). The ACC module 218 receives the first processed audio data 213 and delivers second processed audio data 219 to the mixer 220 based on whether the near end user (e.g., second user 102B) has requested the ACC module 218 to perform advanced call clarity techniques by use of the ACC algorithm. An ACC request may be made by a user using the audio generation device software application 201 and/or using the I/O device 107 that are in communication with the controller 207. Stated otherwise, the second user 102B may request that the ACC techniques be performed by the ACC algorithm of the ACC module 218 during a call with the first user 102A.

The ACC module 218 can include the ACC algorithm and respective hardware used to cancel background noise from the far end (i.e., the first remote location) in the first processed audio data 213 (i.e., perform an ACC technique). The ACC algorithm may be an artificial intelligence (AI) algorithm to detect and remove background noise on the far end and is implemented by use of a high fidelity (HiFi) core, such as a HiFi3 core in the ACC module 218. In general, an AI algorithm will include processes that require combining large sets of data with intelligent, iterative processing algorithms to learn from patterns and features in the data (e.g., audio data) that it has analyzed and/or is analyzing. Each time an AI algorithm runs a round of data processing, it will test and measure its own performance so as to develop additional expertise based on the performance of these activities. In this case, the AI algorithm is used to generate and improve the noise cancellation activities performed by the noise suppression system 110 based on received prior and current data.

The ACC algorithm generates ACC output audio data 225 (FIG. 2B). Generating ACC output audio data 225 includes generating inverse audio data that cancels out the background noise captured on the far end. The ACC algorithm generates the ACC output audio data 225 by determining the background noise present in the first processed audio data 213, and adding the inverse audio data to the first processed audio data 213. The inverse audio data comprises audio data that is the inverse of the background noise present in the first processed audio data 213. The process of determining the background noise can include sampling the audio data to determine patterns, features, trends or other attributes of the signals received by the ACC module 218. In one example, the AI algorithm determines that the background noise includes the constant hum of an electric fan that is "on" within the far end environment and thus makes corrections to remove the unwanted noise.

Referring to FIG. 2B, the ACC module 218 includes a first audio data path 222 and a second audio data path 224. The first audio data path 222 and the second audio data path 224 may be coupled a node "n" that is further coupled to the second input of the mixer 220. In one embodiment, the node n is coupled to the audio output device 108. The first processed audio data 213 received by the ACC module 218 is further split between the first audio data path 222 and the second audio data path 224. The first audio data path 222 may include an optional first buffer. The second audio data path 224 may include a second buffer. The first audio data path 222 may receive the first processed audio data 213 from the transceiver 210 and then provide a first output audio data 223 to form the second processed audio data 219 that is provided to the mixer 220 and the audio output device 108 at a first time. In some embodiments, the second processed audio data 219, which includes the first output audio data 223 provided from the first audio data path 222, is provided to the mixer 220 with no additional signal processing. In other words, the first output audio data 223 received from the first audio data path 222 includes the same audio data as the audio data provided in the first processed audio data 213 received from the transceiver 210.

The second audio data path 224 receives the first processed audio data 213 via a second buffer. The first processed audio data 213 received by the second audio data path 224 undergoes ACC processing techniques after an ACC request has been received by the ACC module 218. The second processed audio data 219, which is generated from the ACC output audio data 225 that has been delivered along the second audio data path 224 is delivered to the mixer 220. The ACC output audio data 225 includes the first processed audio data 213 plus the inverse audio data used to cancel out the background noise found in the audio input data 202 received by an audio device positioned in the far end environment. Thus, the ACC algorithm used to form the ACC output audio data 225 is only applied to the first processed audio data 213 that is provided to the second audio data path 224. To ensure that the only one of the first audio data path 222 or the second audio data path 224 is providing audio data to the mixer 220, a first switch 226 and a second switch 228 are each located between each respective outputs of each of the data paths and the node n. Both the first switch 226 and the second switch 228 are operated based on instructions from the controller 207. The first switch 226 is located between the output of the first audio data path 222 and the node n. The second switch 228 is located between the output of the second audio data path 224 and the node n. The first switch 226 and the second switch 228 advantageously allow for seamless switching between the first audio data path 222 and the second audio data path 224 to prevent disturbances to the output audio data 221 delivered to the second user 102B. This will be explained in more detail below.

As noted above, the second user 102B may request (activate) an ACC technique during a call. As understood by those with ordinary skill in the art, after ACC technique is requested, there is processing time required for the processor running the ACC algorithm to initialize before being able to cancel out background noise on the far end (i.e., load time). During the initialization of the ACC algorithm, if the ACC output audio data 225 (FIG. 2B) is delivered to audio output device 108, the audio delivered to the second user 102B may include unwanted disturbances such as popping sounds, hissing, static, audio discontinuities, or like as the ACC algorithm initializes. As will be described in more detail below, the controller 207, using the first switch 226 and the second switch 228, will ensure that the ACC output audio data 225 is not delivered to the audio output device 108 until the ACC algorithm is initialized.

Referring back to FIG. 2A, in one or more examples, the noise suppression system 110 may include a prompt generator 205 coupled to a volume control module 212 of the transceiver 210. The prompt generator 205 is used to generate prompt audio data 206 comprising voice prompts or tones to inform the second user 102B that features including, but not limited to, muting of the microphone, ANC, ACC, or the like, have been activated/deactivated. The prompts are delivered to the DSP chip 215, and the DSP chip delivers 215 delivers the prompts to the audio output device 108. Stated otherwise, the ACC module 218 may receive the prompt audio data 206 in addition to the first processed audio data 213. In one or more embodiments, after the ACC algorithm is initialized, and controller 207 switches the second processed audio data 219 from comprising the first output audio data 223 to comprising the ACC output audio data 225. However, the switching between the first audio data path 222 and the second audio data path 224 causes the unwanted disturbances (e.g., discontinuities, pops, etc.), which have been found to be annoying and distracting to users of the audio device. To combat this, the controller 207 will instruct the transceiver 210 to deliver the prompt audio data 206 to DSP chip 215 (i.e., the first audio data path 222), and the DSP chip 215 to provide the prompt audio data 206 to the audio output 108 using the first audio data path 222, indicating that an ACC technique has been initialized during the switching of the audio data paths.

In one or more embodiments, the prompt audio data 206 is directly delivered from the prompt generator 205 to a the volume control module 212 of the transceiver 210 so that the prompts are played at a static or fixed volume that is louder than the audio output volume set by second user. For example, the prompts may be played at a volume level from about 80% to about 90% of the maximum allowable volume. This allows the sounds of the prompts to play over the disturbances caused during switching between the first audio data path 222 and the second audio data path 224. Advantageously, this gives a perception of a seamless transition to the delivery of the ACC output audio data 225, which has been processed by the ACC algorithm, to the second user 102B. The duration of the prompt of the prompt audio data 206 is from about 0.5 to about 1.5 seconds.

Figure 3:
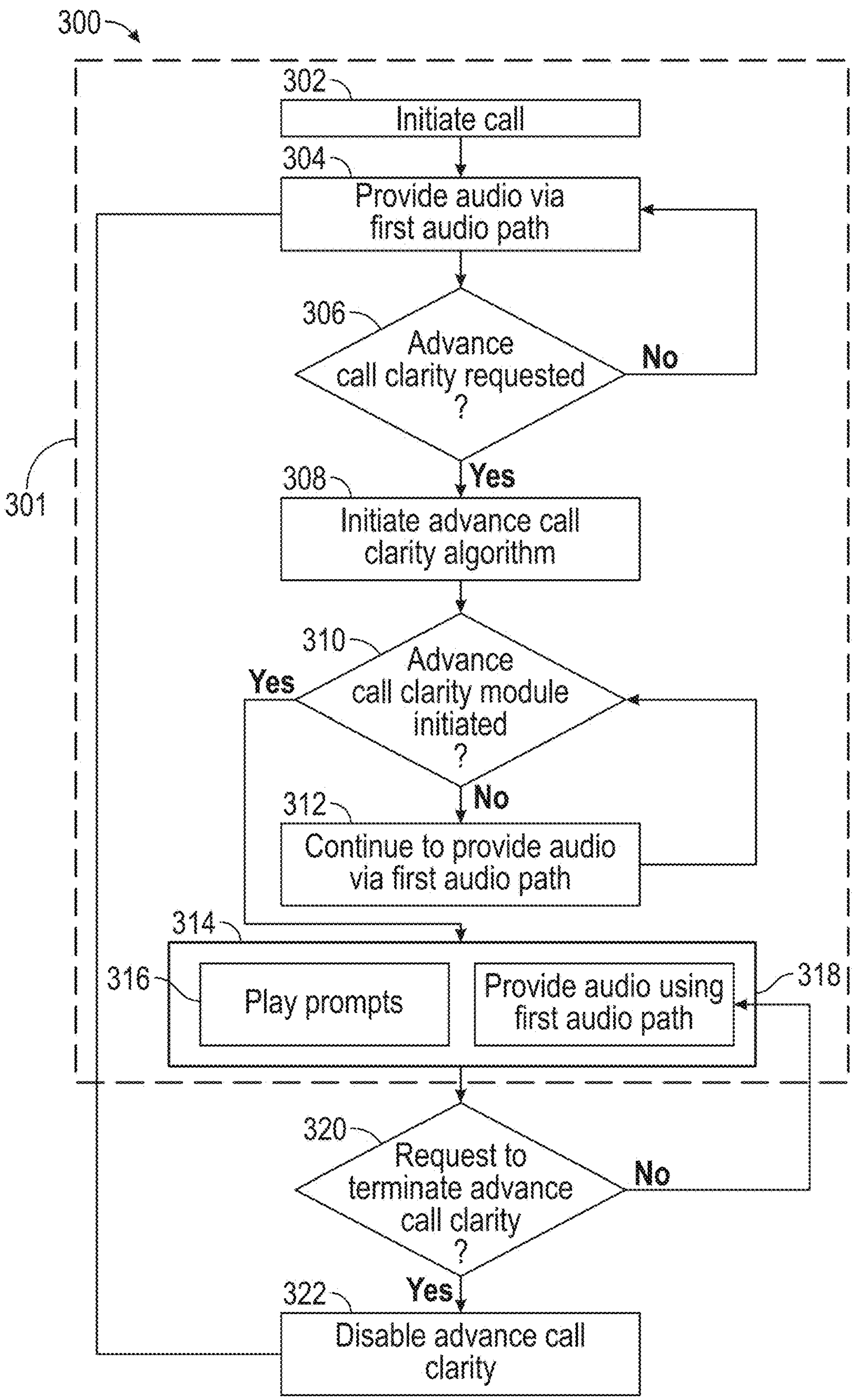
FIG. 3 is a flow diagram illustrating a method for performing advanced call clarity (ACC) using the noise suppression system of FIGS. 2A-2B, according to one or more embodiments.

FIG. 3 is a flow diagram illustrating a method 300 for performing an advanced call clarity (ACC) technique using the noise suppression system of FIGS. 2A-2B, according to one or more embodiments.

At operation 301, the ACC module 218 delivers the ACC output audio data 225 using the second audio data path 224. Stated otherwise the ACC module 218 delivers the ACC output audio data 225 to the mixer 220 (the audio output device 108). In one or more examples, operation 301 includes operations 302-314.

At operation 302, a call between at least two users is initiated. As noted above, the call between the first two users may be performed using a communication software application 170. In addition, as noted above, the call is described from the perspective of the audio device 100 used by a second user 102B on a call with a first user 102A.

At operation 304, the ACC module 218 delivers the first output audio data 223 to the mixer 220 (the audio output device 108) using the first audio data path 222. Stated otherwise, the noise suppression system 110 defaults with ACC activities being set in an off (deactivated) state. In other embodiments, the noise suppression system 110 may default with ACC activities in on (active) state.

At the initialization of the call, the second user 102B has not requested the performance of the ACC activities yet. Stated otherwise, because the ACC technique has not been requested, the ACC module 218 delivers the first processed audio data 213 as received from the transceiver 210 through the first audio data path 222 to the mixer 220. Therefore, the controller 207 defaults the first switch 226 as closed and the second switch 228 as opened. Therefore, the second processed audio data 219 includes the first output audio data 223, which includes the first processed audio data 213 as received from the transceiver 210.

At operation 306, the controller 207 determines whether ACC technique has been requested. The second user 102B may request ACC activities by activating ACC technique in the audio generation device software application 201, or using the I/O device 107. If the second user 102B did not make an ACC technique request, the method 300 returns to operation 304. If the second user 102B did make an ACC technique request, the method proceeds to operation 308 and the controller 207 initiates the ACC algorithm. As noted above, due to the load time of the ACC algorithm the ACC module 218 continues to output the first output audio data 223 using the first audio data path 222. In one or more embodiments, the initialization time for the ACC algorithm is less than the prompt audio data 206 length, such as from about 32 ms to about 64 ms.

In one or more examples, the user may request different levels of ACC technique. The ACC module 218 may deliver different levels of noise cancellation within different applied ACC techniques. In one or more embodiments, the ACC module 218 may deliver a high level or a low level of ACC noise correction. The user may toggle between the levels of ACC noise correction by changing the settings in the audio generation device software application 201, or using the I/O device 107. For example, if the far end includes only minor levels of background noise, the second user 102B may set ACC noise correction to a low level noise correction to conserve battery usage of the audio device. If there are large levels of noise present in the background in the first remote location end, the second user 102B may set the ACC noise correction to a high level. Similarly, if a user makes a request to change the level of ACC the controller 207 will instruct the ACC module 218 to toggle between levels without any interruption of ACC activities. This will described in more detail in FIGS. 4-5 below.

At operation 310, the controller 207 determines whether the ACC algorithm is fully initialized (i.e. running). Upon completion of initialization of the ACC algorithm, the ACC module 218 may send a notification to the controller 207 indicating that the ACC algorithm is running. As noted above, to avoid disturbances in the output audio, the ACC module 218 does not output the ACC output audio data 225 to form the second processed audio data 219 until the ACC algorithm is fully initialized (running). If the controller 207 has not determined that the ACC algorithm is initialized (fully running), the process proceeds to operation 312, and the ACC module 218 still delivers the first processed audio data 213 to the mixer 220 using the first audio data path 222 (without ACC). Once the ACC algorithm is initiated, the process proceeds to operation 314.

At operation 314, the ACC module 218 switches from outputting the first processed audio data 213 using the first audio data path 222 to outputting the ACC output audio data 225 (audio that cancels out background noise on the far end using ACC) via the second audio data path 224. In one or more embodiments, operation 314 includes operation 316 and operation 318. After the controller 207 determines that ACC algorithm is initialized, at operation 316, the controller 207 instructs the prompt generator 205 to generate prompt audio data 206 indicating the ACC technique has been initialized, the transceiver 210 to deliver the prompt audio data 206 to the DSP chip 215, the DSP chip 215 to deliver the prompt audio data 206 to the audio output device 108 (i.e., the second user 102B). Concurrently, at operation 318 the controller 207 instructs (and causes) the ACC module 218 to open the first switch 226 and close the second switch 228. Stated otherwise, the ACC module 218 is now providing the ACC output audio data 225 as the second processed audio data 219 to the mixer 220. As described above, this advantageously, causes the second user 102B to hear the prompts at a loud volume and hides the disturbances that occur due to switching of the audio data paths.

Figure 4:
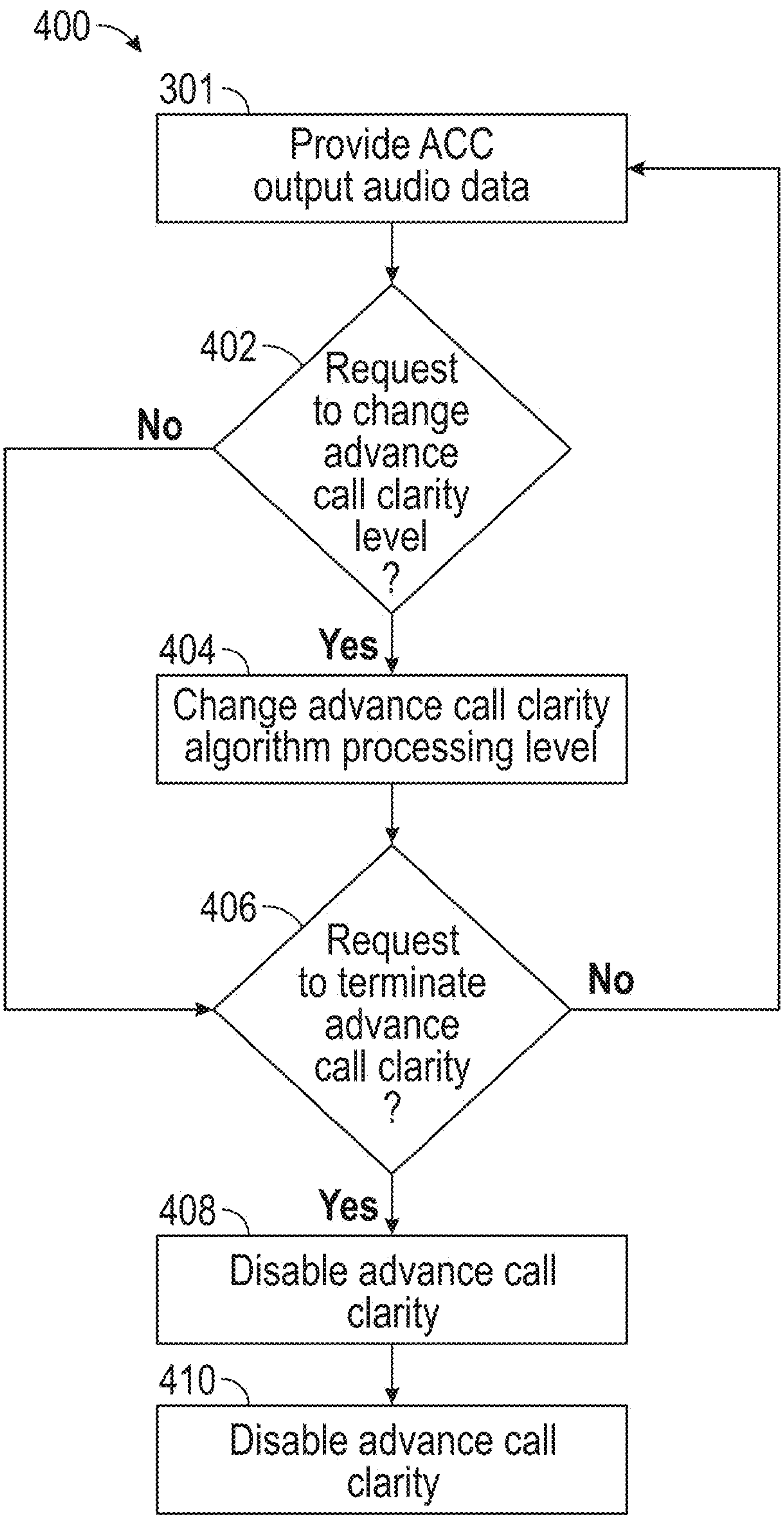
FIG. 4 is a flow diagram illustrating a method for performing advanced call clarity (ACC) using the noise suppression system of FIGS. 2A-2B that includes a request to change a level of ACC, according to one or more embodiments.

FIG. 4 is a flow diagram illustrating a method 400 for performing advanced call clarity (ACC) using the noise suppression system 110 of FIGS. 2A-2B that includes a request to change a level of the ACC technique that is applied, according to one or more embodiments.

At operation 301, the ACC module 218 delivers the ACC output audio data 225 to the mixer 220 (the audio output device 108). In one or more embodiments, operation 301 includes performing operations 302-314 described in method 300 above (FIG. 3).

At operation 402, while the ACC module 218 is providing the ACC output audio data 225 via the second audio data path 224 (i.e., at operation 318 of method 300), the controller 207 determines whether to request a change in the level of ACC is requested. For example, the second user 102B may request the level of the ACC activities to be changed from a low level to a high level (or vice versa), which causes the activities performed by the ACC algorithm to be altered or adjusted to increase the noise cancelation processing. The request to change the level of ACC activities may be made using the audio generation device software application 201 or the I/O device 107.

If the controller 207 determines a request to change the level of ACC is made, the method 400 proceeds to operations 404-406. At operation 404, the controller instructs the ACC module 218 to change the processing level the ACC algorithm from a low level to a high level (or vice versa) based on the request. Although the processing level is changing, there will be no disturbances to the output audio data 221. Therefore, the ACC module 218 will continue to deliver the ACC output audio data 225 as the second processed audio data 219 to the mixer 220. At operation 406, after the level of the ACC algorithm is changed, the controller 207 determines whether a request to terminate the ACC technique is determined.

A request to terminate ACC technique may be made in the same manner as a request to activate the ACC technique and/or change the level of processing performed by the ACC algorithm. If the second user 102B requests to terminate the ACC technique, the method 400 proceeds to operations 408-410 and the controller 207 instructs the ACC module 218 to disable the ACC algorithm, open the second switch 228, and close the first switch 226. Thus, the second processed audio data 219 is provided using the first audio data path 222 (i.e., the first processed audio data 213). If the second user 102B does not request to terminate the ACC technique the method 400 returns to operation 301 and continues to deliver the ACC output audio data 225 via the second audio data path 224 (i.e., operation 318). On the other hand, at operation 402, if the second user 102B does not request a change in the ACC activity level the method 400 skips operation 404 and proceeds directly to operation 406.

Figure 5:
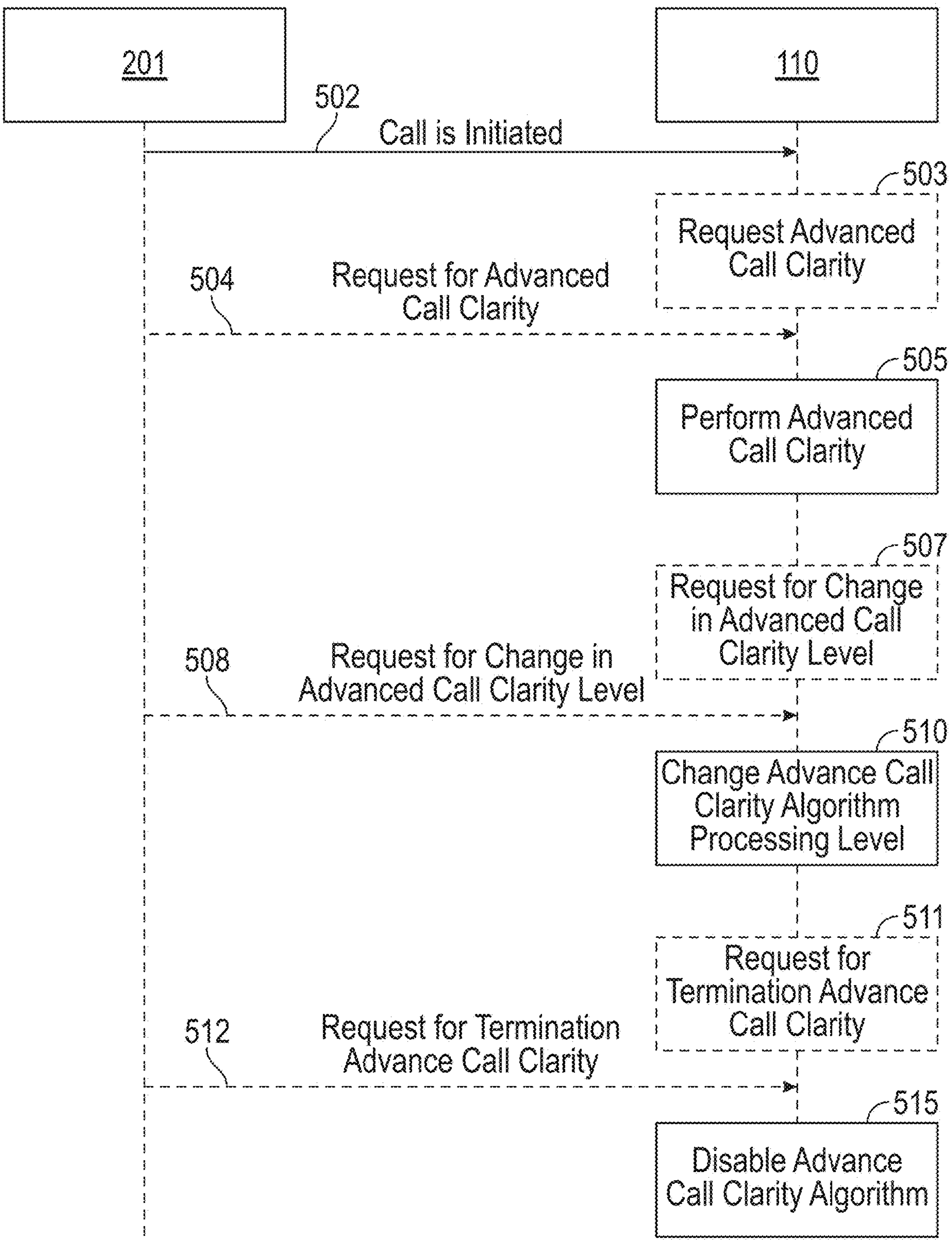
FIG. 5 is a swimlane diagram illustrating a method for performing advanced call clarity (ACC) using the noise suppression system of FIGS. 2A-2B, according to one or more embodiments.

FIG. 5 is a swimlane diagram illustrating a method for performing advanced call clarity (ACC) activities using the noise suppression system 110 of FIGS. 2A-2B, according to one or more embodiments.

At operation 502, a call between at least two users is initiated. The call may be initiated in the same manner described in operation 302.

At operations 503 and 504, the controller 207 of the noise suppression system 110 determines that the second user 102B has made a request for an application of an ACC technique. During operation 503, the user requests the ACC technique via the I/O device 107. Stated differently, the controller 207 is able to directly determine that the second user 102B requested the use of the ACC technique. In operation 504, the second user 102B requests ACC technique using the audio generation device software application 201. Therefore, in operation 504 the controller 207 is notified by the audio generation device software application 201 that the second user 102B has requested ACC. In one or more embodiments, only one of operation 503 or operation 504 is performed. As described above, the request for ACC also indicates whether ACC low level or ACC high level is requested.

At operation 505, upon the ACC technique request, the ACC module 218 of the noise suppression system 110 performs ACC technique (i.e., outputs the ACC output audio data 225 via the second audio data path 224). The ACC module 218 performs the ACC technique in the same manner described in operations 306-314 of method 300.

At operations 507 and 508, the controller 207 of the noise suppression system 110 determines whether the second user 102B has made a request to change the ACC level. In operation 507, the user requests ACC via the I/O device 107. Stated differently, the controller 207 is able to directly determine that the second user 102B requested a change in the ACC level. In operation 508, the second user 102B requests a change in the ACC level using the audio generation device software application 201. Therefore, in operation 508 the controller 207 is notified by the audio generation device software application 201 that the second user 102B has requested a change in ACC level. In one or more embodiments, one of operation 507 or operation 508 is performed.

At operation 510, the ACC module 218 of the noise suppression system 110 changes the ACC processing level. The ACC processing level is changed in the same manner described in operation 404 of method 400.

At operations 511 and 512, the controller 207 of the noise suppression system 110 determines that the second user 102B has made a request to terminate the ACC technique. In operation 511, the user requests to terminate the ACC technique via the I/O device 107. Stated differently, the controller 207 is able to directly determine that the second user 102B requested to terminate the ACC technique. In operation 512, the second user 102B requests to terminate the ACC technique using the audio generation device software application 201. Therefore, in operation 512 the controller 207 is notified by the audio generation device software application 201 that the second user 102B has requested to terminate the ACC technique. In one or more embodiments, either operation 511 or operation 512 is performed.

At operation 515, the ACC technique is terminated by the controller 207 of the noise suppression system 110. The ACC technique may be terminated in the same manner described in operations 320-322 of the method 300.

Referring back to FIG. 2A, the DSP chip 215 further includes the ANC module 216. The ANC module 216 is configured to perform active noise cancellation (ANC) to cancel out background noise in the near end environment in which the audio device is positioned by use of a microphone 105. Stated otherwise, the ANC module 216 is used to cancel out background noise generated in the second remote location in which the second user 102B is located (or vice versa). Advantageously, the noise suppression system 110 is able to cancel out background noise present in far end and/or the near end.

In one or more embodiments, the ANC module 216 includes an ANC algorithm and respective hardware that performs ANC. The ANC module 216 is used to cancel out background noise captured by one or more microphones 105 included in the audio device 100 used by the second user 102B. The ANC module 216 receives near end audio data (soundwaves) captured by one or more microphones 105 included in the audio device 100 used by the second user 102B. The ANC algorithm generates ANC audio data 217 data based on the near end audio data. In one or more embodiments, the ANC algorithm generates ANC audio data 217 that is the inverse of the near end audio data collected by the microphone 105. The ANC audio data 217 cancels out the near end audio data so the second user 102B (the user on the near end) does not hear the background noise generated in the near end environment. The ANC audio data 217 output is delivered to the mixer 220, which combines the second processed audio data 219 with the ANC audio data 217.

In one or more embodiments, the use of the ANC technique is optional. In one embodiment, ANC may only be performed at the request of the second user 102B (i.e., the near end user). Stated otherwise, the ANC audio data 217 is only delivered to the mixer 220 at the request of the second user 102B. The ANC technique is activated/deactivated by the second user 102B requesting the use of the ANC technique. The ANC technique may be requested by the user via the audio generation device software application 201, and/or by the I/O device 107. Upon request by the user, the controller 207 activates/deactivates ANC module 216 (i.e., the ANC algorithm). If the user requests the ANC technique via the audio generation device software application 201, the audio generation device software application 201 will notify the controller 207 of the request. On the other hand, the controller 207 may be aware of the ANC technique request directly if the user makes the ANC technique request using the I/O device 107. Therefore, if the second user 102B makes an ANC request, ANC audio data is delivered to the mixer 220, and the output audio data 221 is a combination of the second processed audio data 219 and the ANC audio data 217. On the other hand, if an ANC request is not made then the output audio data 221 is the same as the second processed audio data 219.

Advantageously the noise suppression system 110 can be configured by the second user 102B to perform the ACC technique and the ANC technique to cancel out background noise on both ends of the conversation. On the other hand, the second user 102B can configure the noise suppression system 110 to perform one of the ACC technique or the ANC technique, or neither of the two. As noted above, the use of the conventional ANC techniques will require a significant amount of processing power and thus electrical power to actively remove the noise generated in the space that the audio device 100 is positioned in real time. Thus, the use of conventional ANC techniques will often dramatically limit the battery life of audio devices 100 that are not directly connected to a power source, such as an electrical outlet. Therefore, in some embodiments, since the ACC technique does not require as much processing power to actively cancel the noise received in the audio input data 202, due to the lower processing speed required to actively cancel the noise in the received signal that includes the audio input data 202 versus the processing speed required to actively cancel the near end generated noise using an ANC technique, the rate of battery power usage can be reduced in an audio device 100 by only using the ACC technique to remove the far end noise and thus ignoring any near end generated noise.

The ANC module 216 may also deliver different levels of ANC. In one or more embodiments, the ANC module 216 may deliver a high level or a low level of ANC activities. The user may toggle between the levels of ANC by changing the settings in the audio generation device application, and/or using the I/O device 107. For example, if the second remote location includes only minor levels of background noise, the second user 102B may set the level of ANC activities to a low level to conserve battery that powers the audio device 100. If there are large levels of noise present in the background on the near end, the second user 102B may set the level of the ANC activities to a high level. Similarly, if a user makes a request to change the level of ANC processing, the controller 207 will instruct the ANC algorithm to change between ANC processing levels.

Referring back to FIG. 2A, as noted above, the prompt generator 205 is used to generate prompt audio data 206 comprising voice prompts or tones to inform the second user 102B that features including, but not limited to, muting of the microphone, ANC, ACC, or the like, have been activated/deactivated. As noted above, the prompts are delivered to the audio output device 108 (i.e., the second user 102B) from the DSP chip 215 via the first audio data path 222 at a static volume. During one or more embodiments if the ACC activities are being performed, and a prompt is provided to the ACC module 218 the prompts may be determined to be background noise and be canceled out. Therefore, to ensure that the prompts are not cancelled out during the initiation of the ACC techniques, if the second user 102B changes a feature, the ACC module 218 will temporarily switch from the second audio data path 224 to the first audio data path 222 until the prompts are finished playing. The duration of the prompts is from about 0.5 seconds to about 1.5 seconds.

Figure 6:
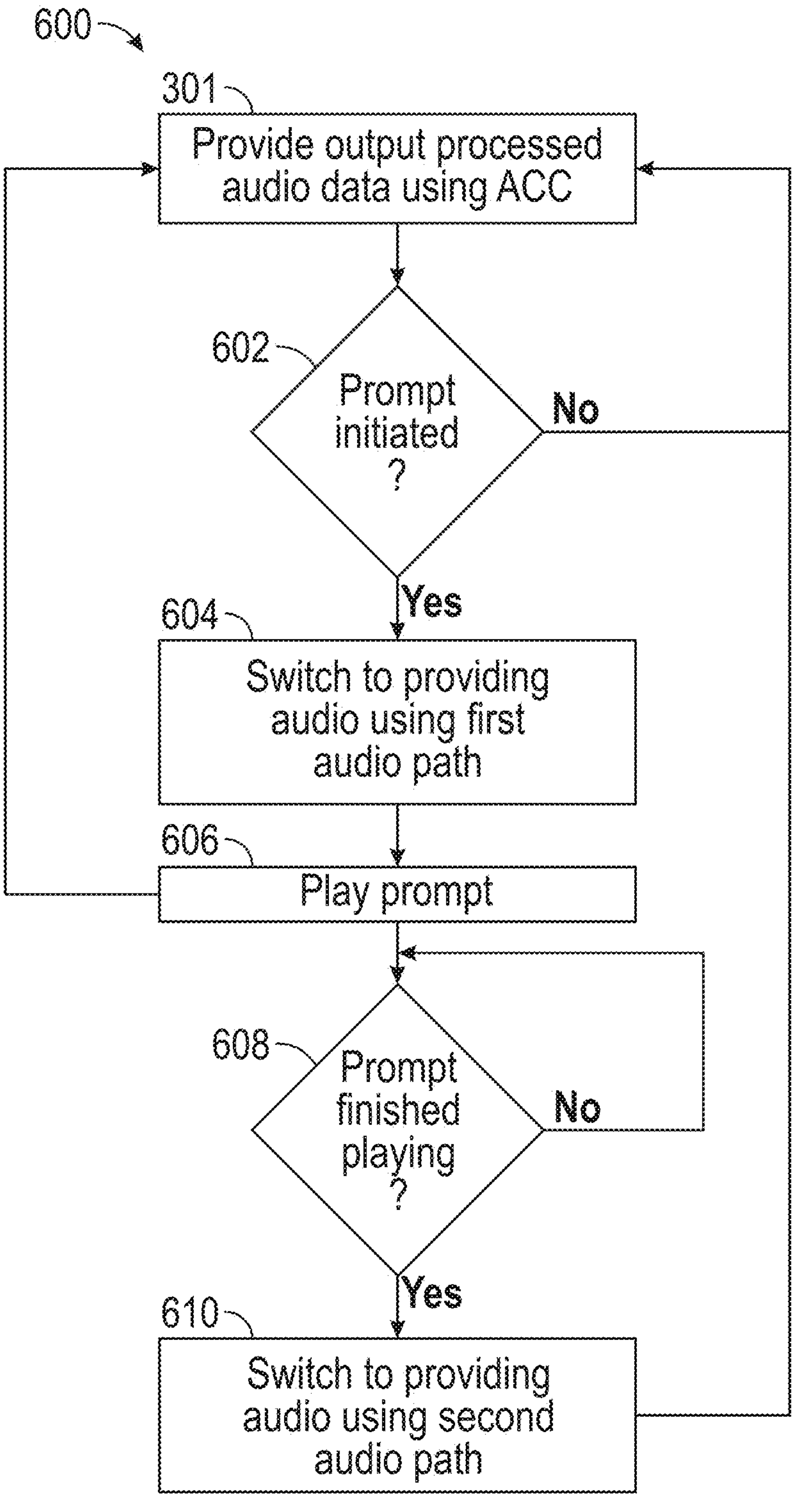
FIG. 6 is a flow diagram illustrating a method for performing advanced call clarity (ACC) using the noise suppression system 110 of FIGS. 2A-2B, according to one or more embodiments.

FIG. 6 is a flow diagram illustrating a method 600 for performing advanced call clarity (ACC) using the noise suppression system 110 of FIGS. 2A-2B, according to one or more embodiments.

At operation 301, the ACC module 218 delivers the ACC output audio data 225 to the mixer 220. In one or more embodiments, operation 301 includes performing operations 302-314 described in method 300 above (FIG. 3).

At operation 602, the controller 207 determines whether the second user 102B has initiated a prompt. As noted above, a prompt is initiated by the second user 102B requesting to activate/deactivate a feature such as muting the microphone, ANC, or the like. If a prompt has been initiated, because ACC is currently being delivered, the method 600 proceeds to operations 604-608.

In some embodiments, during operation 602 an ACC notification is generated by the controller 207 and sent to the user positioned in a far end environment (e.g., user 102A) to notify the user that an ACC technique has been activated and/or that the user 102B is receiving significant level of background noise. The ACC notification can include a visual prompt and/or an audio prompt (e.g., tone or statement) that are provided to a display and/or audio device that are associated with the far end user. The ACC notification, which can be stored in memory, can be sent from the audio device 100 to the far end user 102A via the electronic device 120B and the electronic device 120A using the first and second network links 130A, 130B. The ACC notification received by the far end user 102A can be used by the far end user 102A to remove the unwanted background noise. In one or more embodiments, if both users are using the audio generation device software application 201, the ACC notification may be provided to the far end user 102A by use of the audio generation device software application 201. In other embodiments, if the far end user is not using the audio generation device software application 201 to ACC notification may be provided to the far end user 102A by the communication software application 170.

In some embodiments, if the second processed audio data 219 provided to the audio output device 108 (i.e., the near end user 102B) includes background noise, an alert may be provided to the second user 102B. The alert may inform the near end user 102B that a significant amount of background noise is present in the audio being delivered (i.e., noise on the far end), and suggest that the near end user 102B activate an ACC technique. The alert can include a visual prompt and/or an audio prompt (e.g., tone or statement) that are provided to a display and/or audio device that are associated with the near end user 102B. In one or more embodiments, the alert can be displayed on the audio generation device software application 201. Based on a determination that there is a significant amount of background noise in the second processed audio data 219, the controller 207 may instruct the audio generation device software application 201 to display the alert. In some embodiments, if an ACC technique is being used and a significant amount of background noise is still present, the alert may suggest that the user increase the level of the ACC technique.

At operation 604, the ACC module 218 changes its output path from the second audio data path 224 to the first audio data path 222. In the same manner described above, the controller 207 closes the first switch 226 and opens the second switch 228. This ensures that the prompts will not be cancelled out by the ACC algorithm.

At operation 606, the controller 207 instructs the prompt generator 205 to generate the prompt audio data 206, the transceiver 210 to deliver the prompt audio data 206 to the DSP chip 215, and the DSP chip 215 to deliver the prompt audio data 206 to the audio output device 108 via the first audio data path 222. As noted above the prompt is played at a static volume level from about 80% to about 90% of the maximum allowable volume that cannot be changed by the second user 102B. As noted above the duration of the prompts is from about 0.5 seconds to 1.5 seconds.

At operation 608, the controller 207 determines whether the prompt has finished playing. Upon completion of the prompts the DSP chip 215 sends a notification to the controller 207. If the controller 207 receives the notification (i.e., determines the prompt is finished playing), the method 600 proceeds to operation 610 and the ACC module 218 changes its output path from the first audio data path 222 back to the second audio data path 224 and then method 600 returns to operation 301. The controller 207 instructs the ACC module 218 to close the second switch 228 and open the first switch 226. On the other hand, at operation 608 if the prompts have not finished playing (i.e., the controller has not received to notification) the method 600 waits for the prompts to finish playing before preceding to operation 610.

Figure 7:
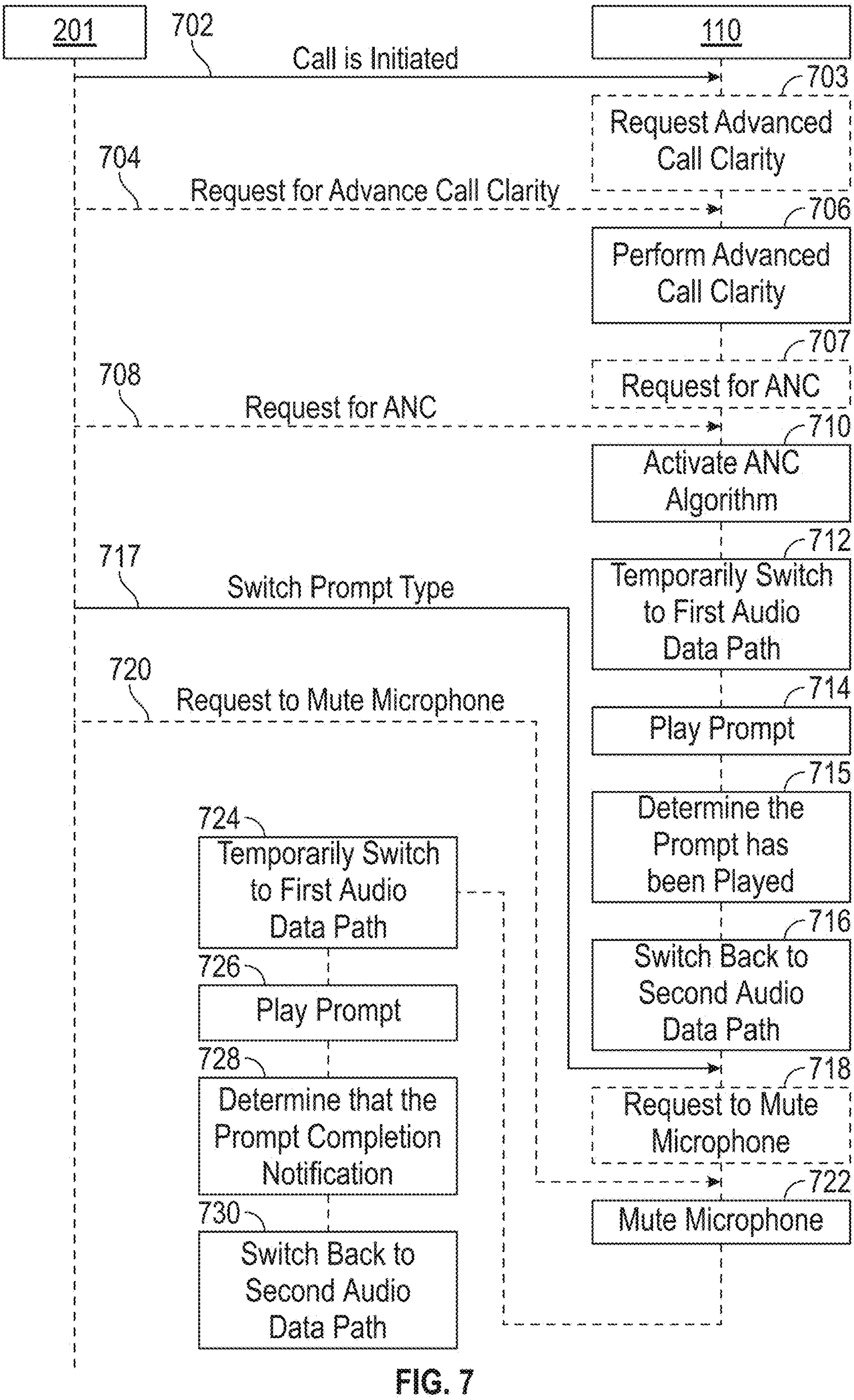
FIG. 7 is a swimlane diagram illustrating performing advanced call clarity (ACC) using the noise suppression system 110 of FIGS. 2A-2B, according to one or more embodiments.

FIG. 7 is a swimlane diagram illustrating performing advanced call clarity (ACC) using the noise suppression system 110 of FIGS. 2A-2B, according to one or more embodiments.

At operation 702 a call between at least two users is initiated. The call may be initiated in the same manner described in operation 302 of method 300.

At operations 703 and 704, the controller 207 of the noise suppression system 110 determines that the second user 102B has made a request for the use of an ACC technique. In operation 703, the user requests ACC via the I/O device 107. Stated differently, the controller 207 is able to directly determine that the second user 102B requested the ACC technique. In operation 704, the second user 102B requests the ACC technique using the audio generation device software application 201. Therefore, in operation 704 the controller 207 is notified by the audio generation device software application 201 that the second user 102B has requested the ACC technique. In one or more embodiments, either operation 704 or operation 705 is performed. As described above, the request for the use of the ACC technique indicates an ACC low level or an ACC high level.

At operation 706, upon the ACC technique request, the ACC module 218 of the noise suppression system 110 performs ACC activities (i.e., outputs the ACC output audio data 225 via the second audio data path 224). The ACC module 218 performs the ACC activities in the same manner described in operations 306-314 of method 300.

At operations 707 and 708, the controller 207 of the noise suppression system 110 determines that the second user 102B has made a request for the ANC technique. In operation 707, the user requests the ANC technique via the I/O device 107. Stated differently, the controller 207 is able to directly determine that the second user 102B requested the ANC technique. In operation 708, the second user 102B requests the use of the ANC technique using the audio generation device software application 201. Therefore, in operation 708 the controller 207 is notified by the audio generation device software application 201 that the second user 102B has requested ANC. In one or more embodiments, either operation 707 or operation 708 is performed. As described above, the request for the ANC technique indicates the ANC low level or the ANC high level. Furthermore as noted above, as described in operation 602, due to the ANC technique request, the controller 207 will initiate a prompt to indicate to the second user 102B that the ANC technique has been activated. The prompt may be a voice prompt or a tone prompt. The type of prompt may be a default or previously set setting in the audio generation device software application 201.

At operation 710, the controller 207 of the noise suppression system 110 instructs the ANC module 216 to activate the ANC algorithm. Thus, ANC is now being performed by the ANC module 216.

At operation 712, and as described above, because the ACC technique is being performed the controller 207 of the noise suppression system 110 instructs the ACC module 218 to temporarily switch the second processed audio data 219 from the second audio data path 224 to the first audio data path 222. Operation 712 is performed in the same manner as operation 604 of method 600.

At operation 714, the controller 207 instructs the prompt generator 205 to generate the prompt audio data 206, the transceiver 210 to deliver the prompt audio data 206 to the DSP chip 215, and the DSP chip 215 to deliver the prompt audio data 206 to the audio output device 108 via the first audio data path 222. Because the ACC technique is currently disabled, the prompt will not be cancelled out as background noise. Operation 714 may be performed in the same manner as operation 606 of method 600.

At operation 715, the controller 207 determines that the prompt was successfully played upon receipt of a prompt completion notification from the DSP chip 215 indicating that the transceiver 210 is finished playing the prompt.

At operation 716, the controller 207 instructs the ACC module 218 to switch the second processed audio data 219 from the first audio data path 222 back to the second audio data path 224, re-enabling the ACC technique because the user had not requested to terminate the ACC technique. Operation 716 is performed in the same manner as operation 610 of method 600.

At operation 717, the second user 102B makes a request to change the prompt type. The second user 102B may make the request to change the prompt type by changing the prompt settings in the audio generation device software application 201. For example, the second user 102B may switch the prompt type from voice to tones (or vice versa).

At operations 718 and 720, the controller 207 of the noise suppression system 110 determines that the second user 102B has made a request to mute the one or more microphones 105 (or any other request that would trigger a prompt). In operation 718, the second user 102B requests to mute the one or more microphones 105 via the I/O device 107. Stated differently, the controller 207 is able to directly determine that the second user 102B requested to mute the one or more microphones 105. In operation 720, the second user 102B requests to mute the one or more microphones 105 using the audio generation device software application 201. Therefore, in operation 720 the controller 207 is notified by the audio generation device software application 201 that the second user 102B has requested to mute the one or more microphones 105. In one or more embodiments, either operation 719 or operation 720 is performed.

Because the second user 102B has triggered a prompt, the noise suppression system 110 performs operations 722-730. Operations 722-730 correspond to operations 712-716. However, at operation 726 the prompts are of the new prompt type requested by the second user 102B.

While the foregoing is directed to embodiments of the present disclosure, other and further embodiments of the disclosure may be devised without departing from the basic scope thereof, and the scope thereof is determined by the claims that follow.

What is claimed is:

1. An audio device comprising:

a noise suppression system configured to deliver output audio data to an audio output device of the audio device, the noise suppression system comprising:

a transceiver configured to receive audio input data; and a digital signal processing (DSP) chip configured to receive first processed audio data from the transceiver and deliver the output audio data to the audio output device of the audio device, the DSP chip comprising:

an advanced call clarity (ACC) module that comprises:

a first audio data path and a second audio data path, and an ACC algorithm of the ACC module, wherein the ACC algorithm determines that background noise is present in the first processed audio data, and forms ACC output audio data by adding inverse audio data to the first processed audio data, the inverse audio data comprising audio data that is inverse to the background noise present in the first processed audio data, wherein an output of the first audio data path and an output of the second audio data path are delivered to a node coupled to the audio output device, the first audio data path is configured to deliver the first processed audio data to the audio output device, and the second audio data path is configured to generate the ACC output audio data based on the received first processed audio data and deliver the ACC output audio data to the audio output device.

2. The audio device of claim 1, wherein the ACC algorithm is configured to generate the ACC output audio data by use of an AI algorithm stored in memory of the noise suppression system.

3. The audio device of claim 1, wherein the ACC module is configured to:

deliver the first processed audio data using the first audio data path to the audio output device;

initialize the ACC algorithm based on an ACC request; and switch from delivering the first processed audio data using the first audio data path to the audio output device to delivering the ACC output audio data to the audio output device using the second audio data path after the ACC algorithm has been initialized.

4. The audio device of claim 1, wherein the ACC module is configured to:

switch from delivering the first processed audio data using the first audio data path to the audio output device to delivering the ACC output audio data using the second audio data path to the audio output device based on an ACC request; and switch from delivering the ACC output audio data using the second audio data path to delivering the first processed audio data using the first audio data path based on a request to terminate ACC.

5. The audio device of claim 4, wherein the ACC module further comprises a prompt generator configured to deliver prompt audio data to the transceiver based on the request for ACC, the transceiver is configured to deliver the prompt audio data to the DSP chip, and the DSP chip is configured to deliver the prompt audio data to the audio output device via the first audio data path during the switch from delivering the first processed audio data using the first audio data path to the audio output device to delivering the ACC output audio data to the audio output device using the second audio data path.

6. The audio device of claim 5, wherein the prompt audio data includes voice prompts or tones.

7. The audio device of claim 1, wherein the DSP chip further comprises:

a mixer having a first input coupled to the node, a second input coupled to an active noise cancellation (ANC) module, and an output coupled to the audio output device.

8. The audio device of claim 7, wherein the ANC module is configured to:

based on a request for ANC, receive background noise captured by one or more microphones of the audio device; and deliver ANC audio data to the mixer, the ANC audio data comprising audio data that is inverse to the background noise captured by the one or more microphones of the audio device.

9. A method comprising:

receiving, by a transceiver of an audio device, audio input data;

receiving first processed audio data from the transceiver, wherein the first processed audio data comprises the audio input data;

receiving a request to activate a feature of the audio device;

delivering, by a prompt generator of the audio device, prompt audio data to the transceiver based on the receiving of the request to activate the feature of the audio device;

delivering, by the transceiver, the prompt audio data to a DSP chip;

delivering output audio data to an audio output device of the audio device, wherein delivering the output audio data comprises:

delivering the first processed audio data using a first audio data path of an advanced call clarity module (ACC);

receiving, by the ACC module, an ACC request;

based on the receiving of the ACC request, switching from delivering the first processed audio data using the first audio data path to delivering ACC output audio data using a second audio data path of the ACC module, wherein an output of the first audio data path and the second audio data path are coupled to a node that is coupled to the audio output device;

based on the receiving of the request to activate the feature of the audio device, switching from delivering the ACC output audio data using the second audio data path to delivering the first processed audio data using the first audio data path; and providing, by the DSP chip, the prompt audio data to the audio output device after the switching from delivering the ACC output audio data using the second audio data path to delivering the first processed audio data using the first audio data path, wherein switching from delivering the first processed audio data using the first audio data path to delivering the ACC output audio data using the second audio data path occurs after the prompt audio data is delivered to the audio output device.

10. The method of claim 9, further comprising:

initializing, by the ACC module, an ACC algorithm of the ACC module based on the receiving of the ACC request;

continuing the delivering of the first processed audio data using the first audio data path of the ACC module while the ACC algorithm is initialized; and switching from delivering the first processed audio data using the first audio data path to delivering the ACC output audio data using the second audio data path after the ACC algorithm is fully running.

11. The method of claim 9, wherein delivering ACC output audio data using the second audio data path of the ACC module comprises:

determining, by an ACC algorithm of the ACC module, background noise present in the first processed audio data; and forming, by the ACC algorithm, the ACC output audio data by adding inverse audio data to the first processed audio data, the inverse audio data comprising audio data that is inverse to the background noise present in the first processed audio data.

12. The method of claim 9, further comprising:

receiving, by the ACC module, a request to terminate ACC; and switching from delivering the ACC output audio data using the second audio data path to delivering the first processed audio data using the first audio data path, based on the request to terminate ACC.

13. The method of claim 9, further comprising:
receiving background noise, by an active noise cancellation (ANC) module, from one or more microphones of the audio device based on an ANC request; and
delivering, by the ANC module, ANC audio data to the audio output device, the ANC audio data comprising audio data that is inverse to the background noise captured by one or more microphones of the audio device.

14. A method comprising:
receiving, by a transceiver of an audio device, audio input data;
receiving first processed audio data from the transceiver, wherein the first processed audio data comprises the audio input data;
receiving a request to activate a feature of the audio device;
delivering, by a prompt generator of the audio device, prompt audio data to the transceiver based on the receiving of the request to activate the feature of the audio device;
delivering, by the transceiver, the prompt audio data to a DSP chip;
delivering output audio data to an audio output device of the audio device, wherein delivering the output audio data comprises:
delivering the first processed audio data using a first audio data path of an advanced call clarity module (ACC);
receiving, by the ACC module, an ACC request;
based on the receiving of the ACC request to activate the feature of the audio device, switching from delivering ACC output audio data using a second audio data path to delivering the first processed audio data using the first audio data path; and
based on the receiving of the request to activate the feature of the audio device, switching from delivering the first processed audio data using the first audio data path to delivering the ACC output audio data using a second audio data path of the ACC module, wherein an output of the first audio data path and the second audio data path are coupled to a node that is coupled to the audio output device, and
providing, by the DSP chip, the prompt audio data to the audio output device after the switching from delivering the ACC output audio data using the second audio data path to delivering the first processed audio data using the first audio data path; and
delivering, by the DSP chip, the prompt audio data to the audio output device during the switching from delivering the first processed audio data using the first audio data path to delivering ACC output audio data using the second audio data path of the ACC module.

15. A noise suppression system comprising:
a transceiver configured to receive audio input data; and
a digital signal processing (DSP) chip configured to receive first processed audio data from the transceiver and deliver output audio data to an audio output device of an audio device, the DSP chip comprising:
an advanced call clarity (ACC) module that comprises:
a first audio data path and a second audio data path, and
an ACC algorithm of the ACC module, wherein
the ACC algorithm determines that background noise is present in the first processed audio data, and
forms ACC output audio data by adding inverse audio data to the first processed audio data, the inverse audio data comprising audio data that is inverse to the background noise present in the first processed audio data,
wherein
an output of the first audio data path and an output of the second audio data path are delivered to a node coupled to the audio output device,
the first audio data path is configured to deliver the first processed audio data to the audio output device, and
the second audio data path is configured to generate the ACC output audio data based on the received first processed audio data and deliver the ACC output audio data to the audio output device.

16. The noise suppression system of claim 15, wherein the ACC module is configured to:
switch from delivering the first processed audio data using the first audio data path to the audio output device to delivering the ACC output audio data using the second audio data path to the audio output device based on a request for ACC; and
switch from delivering the ACC output audio data using the second audio data path to delivering the first processed audio data using the first audio data path based on a request to terminate ACC.

17. The noise suppression system of claim 16, wherein the ACC module further comprises a prompt generator configured to deliver prompt audio data to the transceiver based on the request for ACC, the transceiver is configured to deliver the prompt audio data to the DSP chip, and the DSP chip is configured to deliver the prompt audio data to the audio output device during the switch from delivering the first processed audio data using the first audio data path to the audio output device to delivering the ACC output audio data to the audio output device using the second audio data path.

18. The noise suppression system of claim 15, wherein the DSP chip further comprises:
a mixer having a first input coupled to the node, a second input coupled to an active noise cancellation (ANC) module, and an output coupled to the audio output device.

19. A method comprising:
receiving, by a transceiver of an audio device, audio input data;
receiving first processed audio data from the transceiver, wherein the first processed audio data comprises the audio input data;
delivering output audio data to an audio output device of the audio device, wherein delivering the output audio data comprises:
delivering the first processed audio data using a first audio data path of an advanced call clarity module (ACC);
receiving, by the ACC module, an ACC request; and
based on the receiving of the ACC request, switching from delivering the first processed audio data using the first audio data path to delivering ACC output audio data using a second audio data path of the ACC module, wherein delivering ACC output audio data using the second audio data path of the ACC module comprises:
determining, by an ACC algorithm of the ACC module, background noise present in the first processed audio data; and
forming, by the ACC algorithm, the ACC output audio data by adding inverse audio data to the first processed audio data, the inverse audio data comprising audio data that is inverse to the background noise present in the first processed audio data, and wherein an output of the first audio data path and the second audio data path are coupled to a node that is coupled to the audio output device.

* * * * *